INVENTOR.
Carmel G. Fernandez
BY
William D. Hager
ATTORNEY

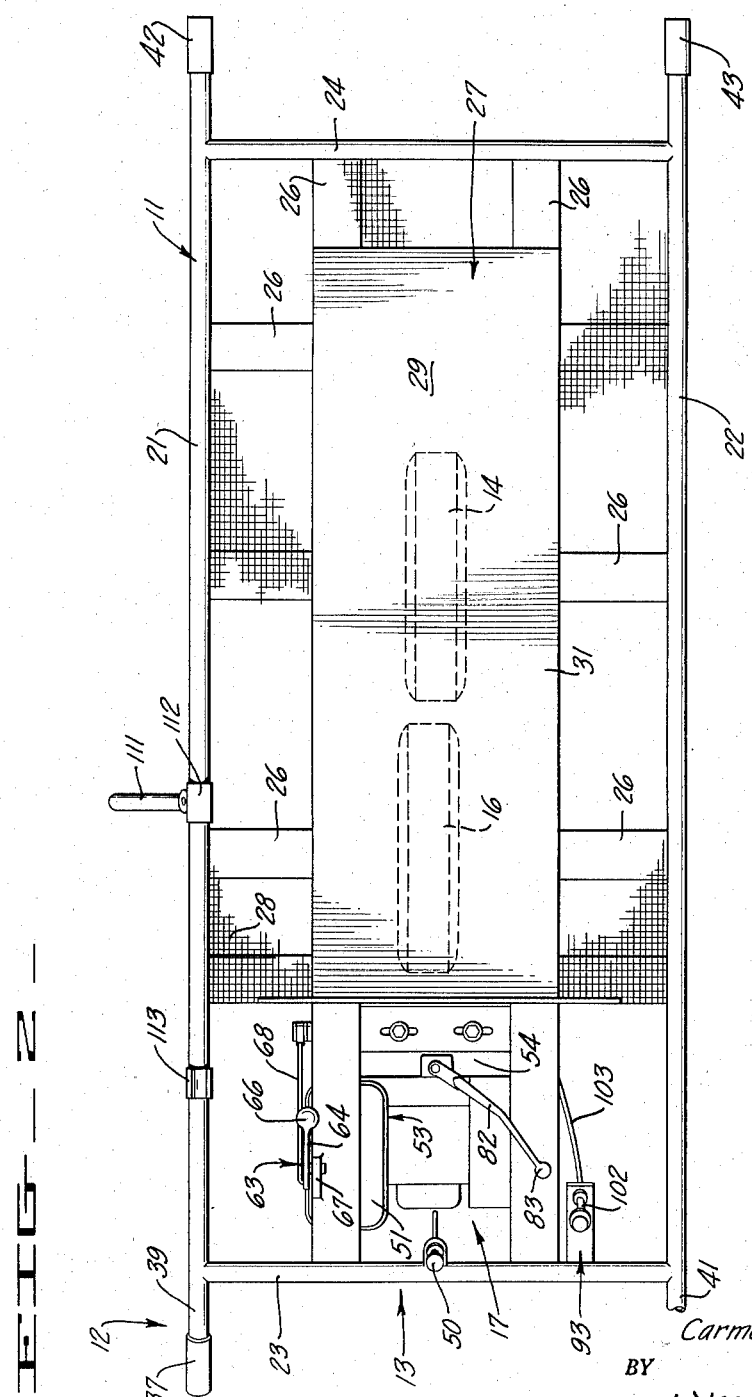

Jan. 20, 1959  C. G. FERNANDEZ  2,869,661
SELF-PROPELLED TANDEM WHEELED CARRIER
Filed Jan. 31, 1956  3 Sheets-Sheet 3
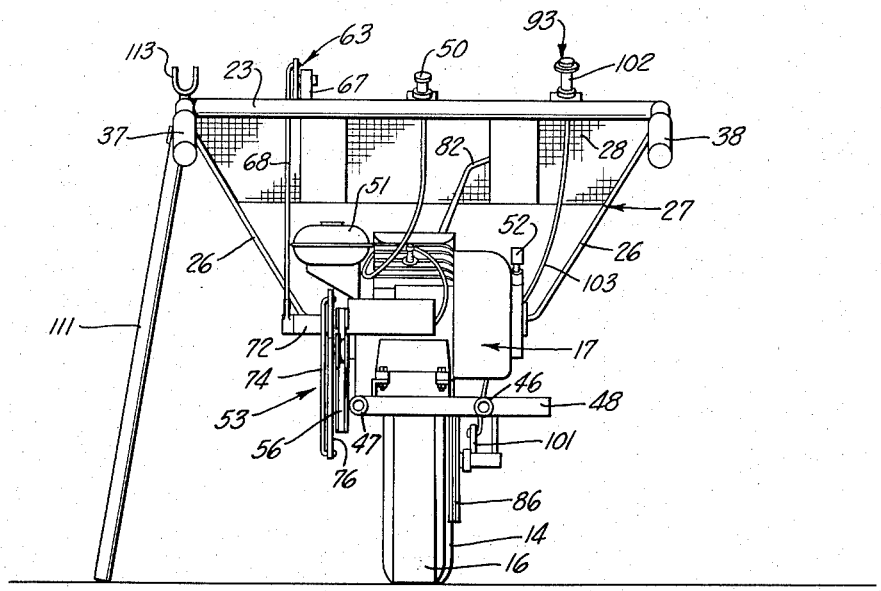
FIG_3_
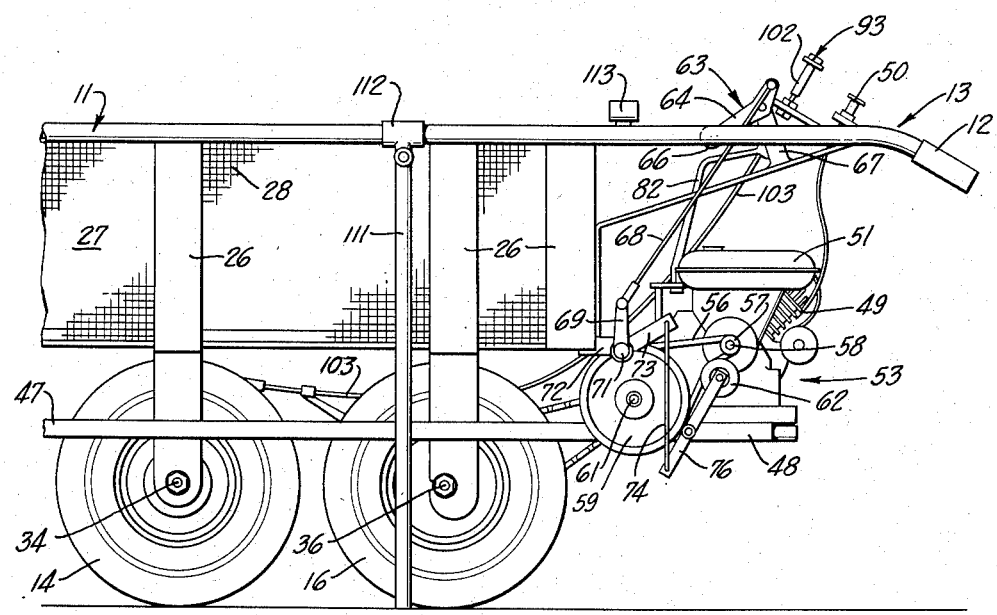
FIG_4_
INVENTOR.
Carmel G. Fernandez
BY
William D. Hager
ATTORNEY

United States Patent Office 2,869,661
Patented Jan. 20, 1959

2,869,661

SELF-PROPELLED TANDEM WHEELED CARRIER

Carmel G. Fernandez, Hayward, Calif.

Application January 31, 1956, Serial No. 562,384

4 Claims. (Cl. 180—19)

The invention relates to carrier devices adapted to be manually steered and controlled by an operator accompanying them on foot, and more particularly to carriers adapted for transporting heavy loads over rugged and hilly terrain under a wide variety of trail and weather conditions.

With the widespread growth of air travel of both a military and commercial nature, a serious problem has arisen in conducting rescue operations to and from aircraft downed in remote and inaccessible regions. Often the only possible means of reaching the aircraft and bringing out the injured and dead is by the use of pack animals. Where such animals are not immediately available, or the loads are too great for packing out, some form of mechanized transporting device is greatly needed. Such a device calls for a vehicle having certain peculiar qualities. For example, a narrowness of construction, particularly at the wheels, is required so that the device may pass easily along narrow trails and between close set trees and rocks generally found in densely wooded areas. Other essential features are comparatively effortless operation by one person, rapid and precise control of speed and pulling power, ready maneuverability, and effective braking means for use in hilly areas. The requirement for narrowness rules out positioning the wheels in the usual side by side relationship found in conventional self propelled load transporting vehicles. Moreover, the difficulty of balancing a heavy load on a single powered wheel makes a mono-wheel device completely impractical. Further desirable features for a rescue vehicle are an elongated frame adapted for supporting a stretcher or the like, a basket-like load containing portion, the ability to cover considerable distances on a small amount of fuel, and versatility as to the type of load transported. Despite the urgent need for such a transporting vehicle, no practical device incorporating these features is presently available.

The self-propelled transporting means of the present invention contemplates a carrier vehicle well adapted for rescue work, hunting, fishing, ammunition transport and like uses and is especially advantageous for negotiating rugged terrain. The device is particularly designed for easy handling and guiding over the many types of rocky, muddy, snowy and overgrown ground which would be encountered in such use, and for ready portability to and from the scene of the rescue operations.

It is, therefore, a principal object of the present invention to provide a transporting carrier adapted for the easy and rapid hauling of heavy loads over wild and heretofore inaccessible terrain.

Another object of the present invention is to provide a transporting carrier which is of relatively narrow width for use through narrow passages and which has its wheels especially arranged to accommodate the carrier to extremely narrow trails.

A further object of the present invention is the provision of a transporting carrier of the character described which is to a great extent self-balancing, thus requiring the expenditure of little effort in this connection on the part of the operator.

A still further object of the present invention is the provision of a transporting carrier of the character described which combines the self-balancing feature with a structure permitting easy and simple change of direction and guiding without the use of complicated steering mechanisms.

Yet another object of the present invention is to provide a device of the character described which provides for full control by the operator of the speed of rotation and the power being transmitted to the wheels so as to regulate the ground speed, hill-climbing and hill-descending characteristics of the device as desired.

Another object of the present invention is the provision, in a device of the character described, of a positive braking means adapted for locking the wheels during parking and for affording any desired drag during downhill movement.

A further object of the present invention is to provide a transporting carrier of the character described in which the guiding handles are mounted in a manner allowing the operator to maintain a constant visual inspection of the carrier and its contents, as well as the trail ahead, with all of the operating controls grouped within easy reach so that the operator can adjust any of the controls while still maintaining his grasp on the handles.

A still further object of the present invention is to provide a transporting carrier of lightweight yet sturdy and rugged construction which may be readily disassembled to permit its being moved as near as possible to the scene of operations in a "jeep," weapons carrier, small truck or the like, and there quickly reassembled for immediate use.

Other objects and features of advantage will be apparent from the following description and the accompanying drawings wherein:

Figure 2 is a plan view of the transporting device of Figure 1.

Figure 3 is a rear elevational view of the device of Figure 1.

Figure 4 is a fragmentary side elevational view of the rear portion of the device and is taken from the opposite side from that of Figure 1.

Figure 1:
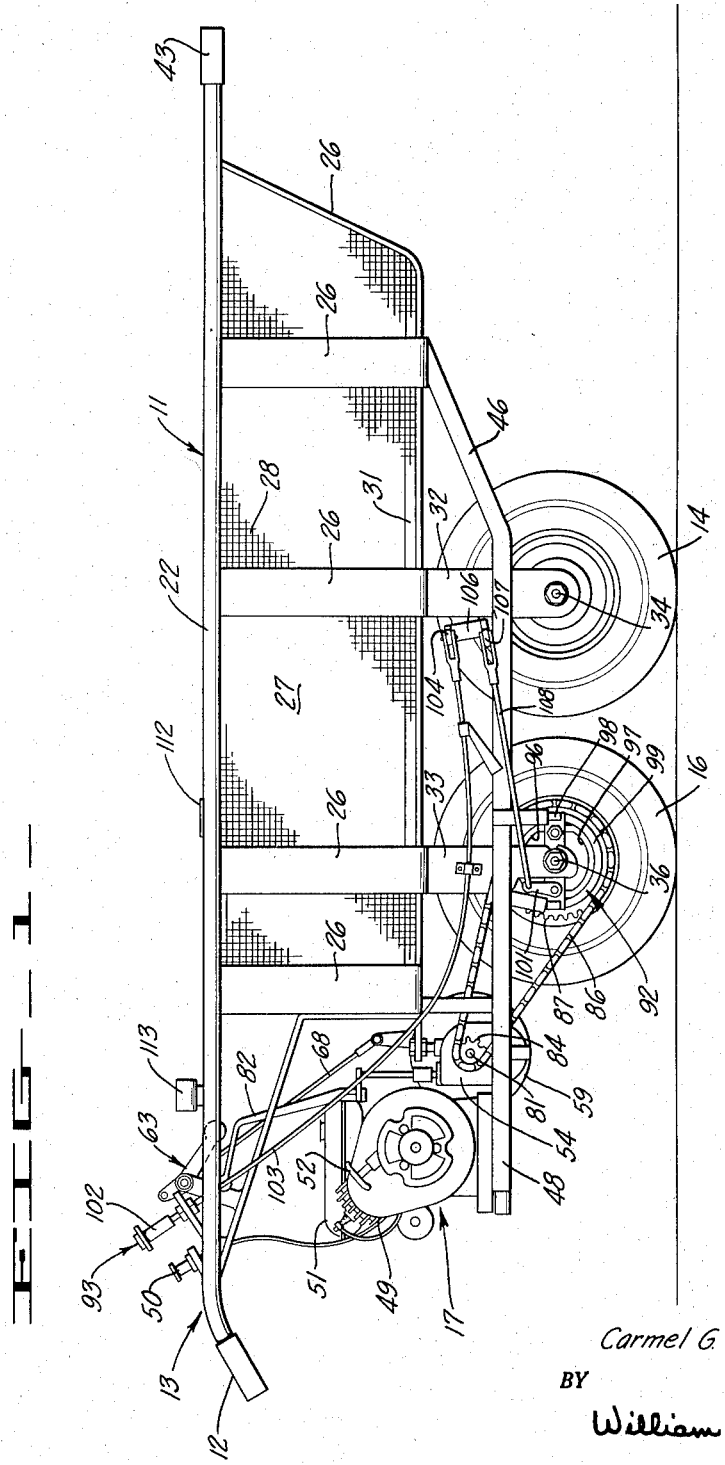
Figure 1 is a side elevational view of a transporting device constructed in accordance with the present invention.

The self-propelled transporting device of the present invention, and as illustrated in the accompanying drawings, includes an elongated frame 11 having a handle 12 at the rear end 13 of the frame, a pair of wheels 14 and 16 journalled in tandem relation in the frame 11, and motor means 17 carried by the frame and having an operative connection to one of the wheels for driving the device over the ground. As a feature of the invention, the frame 11 is of elongated, horizontally extending form of comparatively narrow width, see Figure 2, and preferably includes a pair of spaced longitudinally extending parallel tubular members 21 and 22 joined adjacent their opposite ends by tubular cross members 23 and 24. Flattened members 26 are connected to the tubular members, as by welding, and slope downwardly and inwardly therefrom to define a basket-like load-containing compartment 27 which may be lined with a suitable screen mesh 28. The bed 29 of the compartment 27 is preferably solid and may be provided by a sheet 31 of plywood or the like as dictated by requirements for lightness. Extensions 32 and 33 of members 26 project downwardly from the bed 29 and provide a convenient support for the wheels 14 and 16 which may be journalled on axles 34 and 36 releasably secured to the downwardly projecting extensions. As here shown, the handle 12 preferably includes a pair of grips 37 and 38 mounted on end portions 39 and 41 of members 21 and 22 which extend past the cross members 23 and 24. An additional pair of grips 42 and 43 may be mounted on the front ends of the members 21 and 22 for use by a second operator, if so desired. It will be understood that, while the device is well adapted for operation by a single person at its rear end, under extreme conditions (such as, for example, a very windy day in exposed places) the steadying influence of a second operator at the front of the vehicle might be advantageous.

The motor means 17 is preferably mounted at the rear end 13 of the frame so as to be readily accessible and visible to the operator of the device. As may best be seen in Figures 1 and 3 of the drawings, such mounting is here provided by forming the frame 11 with a pair of longitudinal bars 46 and 47 secured at their forward ends to the bed 29 and passing horizontally under the bed and extending rearwardly therefrom; the bars 46 and 47 being attached to and supported by the downwardly projecting frame extensions 32 and 33. The rear ends of the bars 46 and 47 are joined as by a plate to provide a platform 48 upon which the motor means may be mounted.

In accordance with the present invention, the motor means 17 here consists of a gasoline motor 49 which may be of any suitable type powerful enough to drive the device under all contemplated conditions, but preferably as light in weight as is consonant with the other requirements. For a transporting carrier designed to transport 600 to 700 pounds weight, a conventional one-cylinder motor of the type commonly used on powered lawnmowers or garden tillers and having an output of 2½ to 3½ horsepower has proved to be entirely adequate. Preferably, for reasons of stability, the motor is positioned as low as possible while still maintaining a reasonable clearance above the ground. Accordingly, and as shown, the platform 48 for the motor is located approximately 12 to 14 inches above the ground. The motor shown is equipped with a manually operable throttle 50 conveniently mounted on the rear end 13 of frame 11 adjacent handle 12. The motor is also equipped with the usual fuel tank 51 and desirably is also provided with a built-in starting cable having a handle 52 located for easy grasping by the operator from his station at the handle 12.

The aforementioned operative connection of the motor means 17 to one of the wheels 14 and 16 is designed to afford complete control of the amount of power being exerted on the driven wheel as well as control of the speed at which such wheel rotates and hence the over-the-ground speed of the vehicle. To provide such control, the operative connection here includes a clutch means 53 and a variable ratio transmission 54 which co-operate with the speed at which the motor is run to afford vehicle momentum and power control. The clutch means 53 may best be seen in Figure 4 of the drawings and consists of a V-belt 56 which is entrained around a drive pulley 57 mounted on the motor output shaft 58 and a driven pulley 59 mounted on the input shaft 61 of the transmission 54. The belt is normally loose on the pulleys and is selectively brought into driving engagement with them by means of an idler 62 which may be moved against the belt to tighten it on the pulleys and thus, in effect, engage the clutch means.

A manually operable control means 63 for the clutch means 53 is mounted adjacent the handle 12 on the rear end 13 of the frame in position for convenient and rapid engaging and disengaging of the clutch means by the vehicle operator. As here shown, the clutch control means 63 includes a bell crank 64 having a manually engageable knob 66 at one end and pivotally supported on a pedestal 67 mounted on the frame 11. The other end of the crank 64 is connected by a link 68 to an arm 69 fixed to a shaft 71 journalled in a bracket 72 supported by the vehicle frame 11. A second arm 73 is fixed to the shaft 71 and is connected by a link 74 to one end of a lever member 76 which is pivotally supported on platform 48 and which carries the idler 62 at its other end. It will be noted that the parts are proportioned and positioned so that movement of the control knob 66 to the position illustrated in Figure 4 of the drawings will swing the idler 62 against the belt to engage the latter with the pulleys 70 and 59. With the knob 66 in this position, the connection of link 68 to crank 64 will be swung upwardly slightly past alignment with the pivotal connection of the crank 64 to pedestal 67 thus affording an overcenter toggle action which will hold the idler 62 against the belt until released by pulling the knob 66 upwardly.

The transmission 54 may be of any suitable type affording a variable ratio between its input shaft 61 and its output shaft 81. A conventional two-speed geared transmission having a shift lever 82 for selectively engaging high or low transmission ratios has proved suitable for use with the present device. As will be noted from Figures 1 and 2 of the drawings, the shift lever 82 extends upwardly and is provided with a manually operable knob 83 positioned adjacent the vehicle handle 12 convenient to the operator. As here shown, the output shaft 81 of the transmission is provided with a sprocket 84 which engages a chain 86 entrained around a sprocket 87 connected to the rear wheel 16. It will be understood that the transmission may be connected to and drive either or both of the wheels 14 and 16. However, it has been found that driving the rear wheel affords certain advantages in steering the device and especially in climbing over large rocks and the like. For example, the normal method of steering the vehicle would be to press downwardly on the handle 12 and pivot the device around the rear wheel. In so doing it is obvious that a constant flow of power to the wheel remaining in contact with the ground may aid in maneuvering the device. Likewise, when attempting to climb over large rocks or the like often encountered in the path of the vehicle, the operator would normally press down on the handle 12 to aid the front wheel in climbing over the obstruction and again power would be transmitted to the wheel remaining on the ground.

In accordance with the present invention, a positive brake means is provided to afford the operator a control over the downhill speed of the vehicle in addition to the drag of the motor means 17 through the transmission 54. As may best be seen in Figure 1 of the drawings, the brake means includes a mechanical brake 92 mounted on the rear wheel 16 and a manually operable control means 93 mounted on the rear end 13 of the vehicle frame 11. The brake 92 is a conventional mechanically operated automotive type and consists of a pair of brake shoes 96 and 97, carried by a bracket 98 secured to the frame 11, and engageable with a brake drum 99 on wheel 16 upon movement of a lever 101 to the left as viewed in Figure 1. The brake control means 93 includes a manually engageable knob 102 mounted adjacent the frame handle 12 and connected by a flexible cable 103 to an arm 104 secured to a shaft journalled in a bracket 106 secured to frame extension 32. A second arm 107 is secured to the same shaft and is connected by means of a link 108 to the brake lever 101. Movement of the knob 102 upwardly will, by means of cable 103, pull the arm 104 to the left as viewed in Figure 1. Since arm 107 is secured to the same shaft as arm 104, link 108 and brake lever 101 will also move to the left applying the brakes with a force directly proportional to the force exerted in pulling brake knob 102 upwardly. This action will give the vehicle operator control of the brake drag on the rear wheel for slowing and stopping the vehicle. Preferably a certain amount of friction is present in the cable 103 to hold the brakes on when parked.

As an important feature of the present invention, the tandem wheels 14 and 16 are so positioned with relation to the rest of the device as to afford a stability hitherto unobtainable in tandem wheeled vehicles. In order to make the vehicle maneuverable by one person when carrying loads in the order of 600 to 700 pounds the wheels are preferably spaced apart by a distance no greater than the diameter of one wheel. For example, in a machine having 16 inch outside diameter wheels a spacing of the wheels so that their peripheries are more than 16 inches apart will unnecessarily increase the effort required to turn the vehicle. In actual practice it has been found that the closer the wheels are to one another the easier the vehicle is to maneuver. This leads to the conclusion that a single wheel would be advantageous, but this theory has proven to be fallacious because the vehicle is then in effect supported on a single point and may tip forwardly or rearwardly thus requiring a constant balancing by the operator. When power is applied to such a single wheel it is almost impossible to transport loads of the weight contemplated. Therefore it has become apparent that a pair of tandem wheels spaced apart by a distance no greater than the diameter of the wheels themselves affords good fore and aft stability while retaining easy maneuverability. It will be noted that the parts of the device should be so formed and positioned that the center of gravity of the device will lie above and between the centers of the wheels in both loaded and unloaded condition of the vehicle in order to prevent any unwanted tendency of the machine to tip forwardly or rearwardly.

In accordance with the present invention and as an important feature thereof, sidewise or lateral stability is provided while still retaining the extremely desirable feature of a very narrow track. To provide such lateral stability, that is, tendency to prevent sidewise tipping, the wheels 14 and 16 of the transporting device are offset slightly in relation to each other, while still retaining proper fore and aft alignment. It has been found that a relatively slight offset exerts a considerable steadying effect. For example, in a machine utilizing 4.00 x 8 inch tires, an offset of approximately one half inch will be quite effective in stabilizing lateral sway without materially increasing the width of track required by the vehicle. Preferably, the device is formed so that the center of gravity lies on the plane of the longitudinal centerline of the frame, and the wheels are offset equal distances to opposite sides of such plane. Under certain conditions, where stability becomes more important than a minimum track width, the wheels may be offset by a somewhat greater distance; the main limitation being that the wheels still be retained in a generally tandem relation.

In operation, the device may be transported by any suitable vehicle as near to the rescue site as possible. To allow its movement by a vehicle having limited cargo room, the wheels 14 and 16 and the motor 49 may be removed from the frame and, if required, the frame may be at least partially collapsed. Upon arriving at such remote point as the "jeep" can penetrate, the carrier is reassembled, the material to be transported such as stretchers, medical supplies, hunting and fishing gear or the like are placed in the load compartment 27 and the operator takes his place at the handle 12. The motor is started by means of the starter handle 52 and its speed is regulated by throttle 50. The desired gear is chosen by manipulating the gear shift lever 82, the brake is released, and the clutch is engaged by pushing the knobs 102 and 66, respectively, downwardly to the position shown in the drawings to start the device moving over the ground. It will be noted that all of the operating controls are positioned at the rear of the machine adjacent the handle 12 so that the operator of the device may readily grasp and manipulate them with one hand while steadying the carrier vehicle with his other hand. Should a steep hill be encountered the operator merely disengages the clutch means and shifts the transmission to the gear ratio desired. In traveling downhill both the resistance of the motor acting through the transmission and the controllable drag of the brake means may be employed to give the operator constant control. Turning of the machine and climbing over obstacles is easily effected as previously described by merely pressing downwardly on the handle 12. In cases where the load may be of a shifting nature, or where wind or other conditions tend to upset the device, a second person may be employed at the front handles to assist the operator. When parking the machine, the clutch is disengaged and/or the motor is turned off. A leg 111 pivoted on a sleeve 112 rotatably mounted on the frame member 21 may be used as a stand to park the device in upright position, the leg being swung up and rested in a fork 113 on member 21 when not in use.

From the foregoing description it will be apparent that the transporting means of the present invention provides a novel tandem wheeled vehicle of a character not previously envisioned which is particularly adapted through its durability and compactness to the rough usage of rescue work and the like, requiring the transportation of heavy loads through remote and inaccessible terrain. In addition to its ability to travel along narrow trails and through areas of limited width, the present device affords a flexibility of control permitting its use for hauling a variety of loads, and an inherent stability making such a vehicle practical. It is particularly useful in deer hunting ventures, and the like, wherein it is now possible to recover mortally wounded game animals and carcasses heretofore often lost or abandoned because of trail conditions formely considered impassible.

While the salient features of this invention have been described in detail with respect to certain embodiments, it will of course be apparent that numerous modifications may be made within the spirit and scope of this invention, and it is not therefore desired to limit the invention to the exact details shown except insofar as they may be defined in the following claims.

What is claimed is:

1. A self-propelled transporting device comprising, a horizontally extending load-supporting frame, a pair of wheels each having a central longitudinal plane and journalled in tandem relation in said frame and depending therefrom for engagement with the ground, said wheels being spaced apart by a distance less than the diameter of said wheels, a handle secured to the rear end of said frame for guiding the device over the ground, motor means mounted on said frame and having an operative connection to one of said wheels for driving said device over the ground, a throttle control for said motor means mounted on said frame adjacent said handle, clutch means in said operative connection for selectively engaging said motor means to said wheel and having a manually operated control mounted adjacent said handle, and brake means connected to one of said wheels and having a manually operated control mounted on said frame adjacent said handle, said wheels being positioned so that each of said planes is laterally spaced with respect to the other and disposed on opposite sides of the longitudinal vertical plane carrying the center of gravity of said frame and motor means with the vertical plane defining one side of one wheel falling within the space defined by the width of the other wheel.

2. A self-propelled transporting device of the character described in claim 1 and wherein said operative connection includes a selectively variable ratio transmission having a manually operable ratio control mounted on said frame adjacent said handle.

3. A self-propelled transporting device comprising, a horizontally extending elongated frame having a load carrying basket extending substantially the length thereof, a pair of wheels each having a central longitudinal plane and journalled in tandem relation in said frame beneath said basket and depending therefrom for engagement with the ground, said wheels being spaced longitudinally apart by a distance less than the diameter of said wheels and lying in parallel planes offset laterally with respect to each other by a distance less than the tread width of said wheels, a handle secured to the rear end of said frame for guiding the device over the ground, a gasoline motor mounted on said rear end of said frame, a variable ratio transmission connected to the rearmost of said wheels and having a manually operable control belt and pulley means connecting said motor and transmission and having a manually operable control formed for selectively engaging said belt and pulley means with said motor to provide a clutch, brake means connected to said rearmost wheel and having a manually operated control, said wheels being positioned so that the center of gravity of the device is orientated longitudinally between the centers of said wheels and positioned so that said central longitudinal planes of said wheels are offset laterally to opposite sides of said center of gravity, and means supporting said controls adjacent said handle and within reach of the operator.

4. A self-propelled transporting device comprising, an elongated load-supporting frame having a handle at one end, a pair of wheels each having a central longitudinal plane and journalled on said frame in tandem relation, said planes of said wheels being positioned in laterally spaced parallel vertical relation on opposite sides of the longitudinal plane carrying the center of gravity of said device with the lateral spacing between the central longitudinal planes of said wheels being less than the tread width of said wheels and being longitudinally spaced apart by a distance less than the diameter of said wheels, and motor means on said frame having an operative connection to one of said wheels for driving said device.

References Cited in the file of this patent

UNITED STATES PATENTS

| | | |
|---|---|---|
| 1,257,416 | Sperry | Feb. 26, 1918 |
| 1,416,539 | Wilms | May 16, 1922 |
| 1,724,774 | Parrott | Aug. 13, 1929 |
| 2,046,424 | Palen | July 7, 1936 |
| 2,085,312 | Gourley | June 29, 1937 |
| 2,212,589 | Decker | Aug. 27, 1940 |
| 2,567,423 | Cleghorn | Sept. 11, 1951 |
| 2,656,894 | Giovannoni | Oct. 27, 1953 |
| 2,715,030 | Peterson | Aug. 9, 1955 |
| 2,761,690 | Bradley | Sept. 4, 1956 |